United States Patent [19]
Connelly et al.

[11] Patent Number: 5,944,252
[45] Date of Patent: Aug. 31, 1999

[54] CORRUGATED BOARD CONTAINER AND METHOD OF MAKING THE SAME

[75] Inventors: Thomas S. Connelly, Gladwyne; Michael J. McGinley, Philadelphia, both of Pa.; Alexander Strachan, III, Marlton, N.J.

[73] Assignee: Connelly Containers, Inc., Bala Cynwyd, Pa.

[21] Appl. No.: 08/818,271

[22] Filed: Mar. 18, 1997

[51] Int. Cl.⁶ ............................... B65D 5/42; B31F 1/22; B32B 3/28

[52] U.S. Cl. ........................ 229/132; 156/205; 156/210; 229/931; 229/939; 428/182

[58] Field of Search .................................... 229/132, 136, 229/5.84, 5.82, 169, 930, 931, 939, 940; 428/34.2, 182; 156/183, 205, 207, 210

[56] References Cited

U.S. PATENT DOCUMENTS

| | | | |
|---|---|---|---|
| 2,791,369 | 5/1957 | Paige | 229/939 |
| 3,214,322 | 10/1965 | Gianatasio | 428/182 |
| 3,256,126 | 6/1966 | Bachofen | 156/210 |
| 3,523,058 | 8/1970 | Shick | 229/939 |
| 3,635,451 | 1/1972 | Wagner | 229/939 |
| 4,511,078 | 4/1985 | Rauser et al. | 229/931 |
| 4,693,413 | 9/1987 | McFarland et al. | 229/930 |
| 5,575,418 | 11/1996 | Wu et al. | 229/939 |
| 5,698,295 | 12/1997 | Benner et al. | 428/182 |
| 5,772,819 | 6/1998 | Olvey | 156/210 |

*Primary Examiner*—Gary E. Elkins
*Attorney, Agent, or Firm*—Panitch Schwarze Jacobs & Nadel, P.C.

[57] ABSTRACT

A method of making corrugated board having at least one fold region includes the steps of securing at least two sheets of paper liner in complementary facing engagement to create a first multi-layer liner. A first set of ridges of a first corrugated paper medium is secured to the first multi-layer composite liner to create a first single-face web. At least two sheets of paper liner are secured in complementary facing engagement to create a second multi-layer composite liner. A first set of ridges of a second corrugated paper medium is secured to the second multi-layer composite liner to create a second single-face web. A selected portion of the second corrugated paper medium is compressed to create an area to be bent. A second set of ridges of the first corrugated paper medium is secured to the second multi-layer composite liner. Adhesive is applied to the second set of ridges of the second corrugated paper medium, except for the compressed selected portion. A third liner is secured to a second set of ridges in the second corrugated paper medium such that the selected portion of the second corrugated paper medium is spaced from the third liner. The first multi-layer composite liner, the first corrugated paper medium, the second multi-layer composite liner and at least part of the selected portion of the second corrugated paper medium are cut along two lines to form a cutout area which is aligned with the bend area. The cutout area is then removed from the corrugated board using a vacuum process.

41 Claims, 7 Drawing Sheets

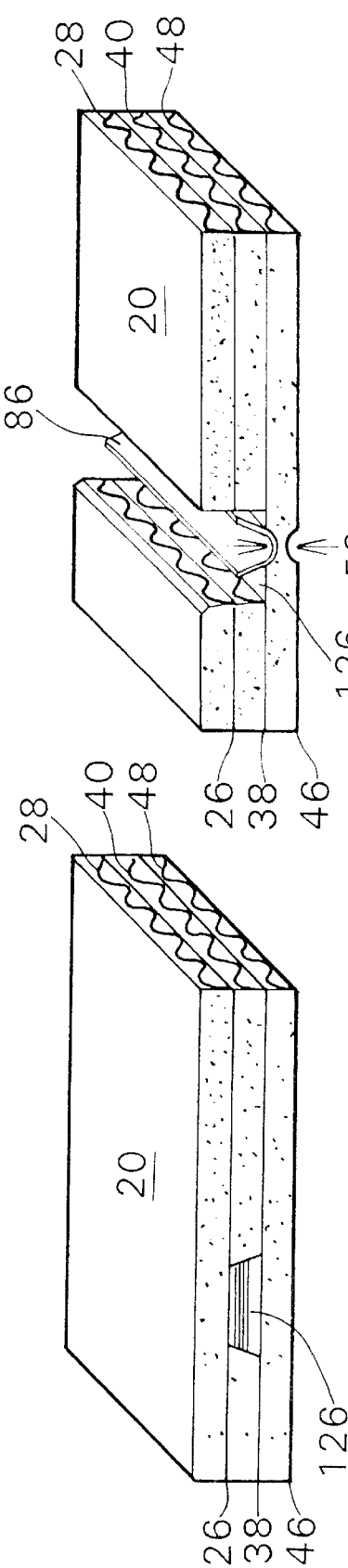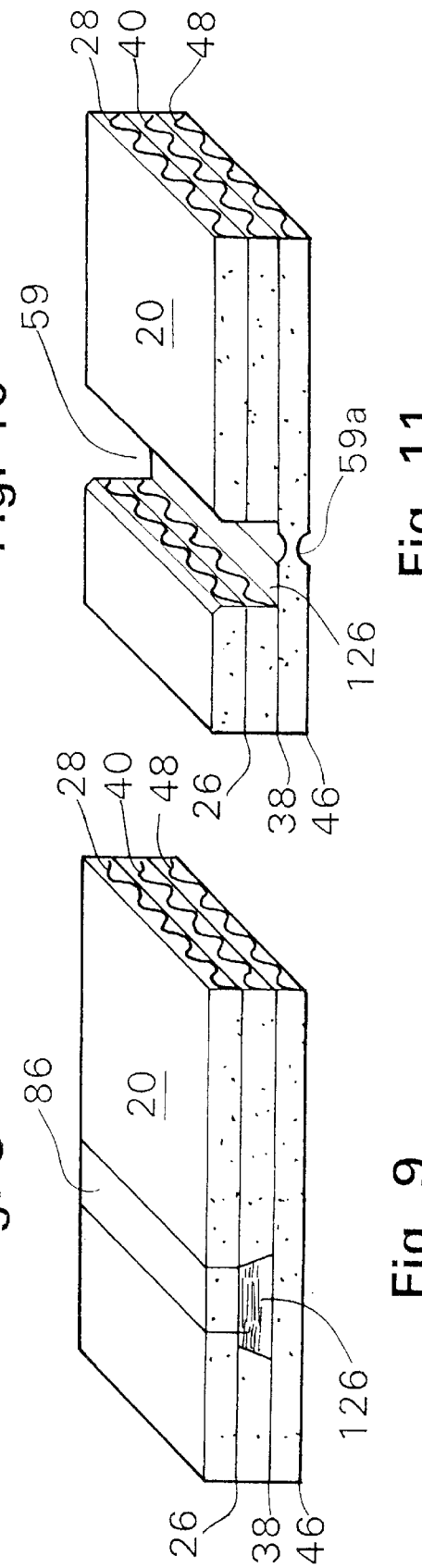

CORRUGATED BOARD CONTAINER AND METHOD OF MAKING THE SAME

BACKGROUND OF THE INVENTION

The present invention relates generally to corrugated paperboard and, more particularly, to a corrugated paperboard container having a fold region and method of making the same.

Corrugated paperboard has many uses, the most common of which is its use in making a multitude of different types of containers for shipping and storage. Such containers are made from single wall, double wall, and triple wall corrugated paperboard. The overwhelming majority of corrugated paperboard containers are constructed from single wall board. This category of container makes up approximately ninety percent of the entire market for corrugated paper containers. Containers constructed from double wall corrugated paperboard comprise approximately eight percent of the container market, while triple wall corrugated board comprises approximately two percent.

The basic form of corrugated paperboard is well known, having a structure consisting of corrugated paper medium interposed between single layer sheets of paper liner. Single wall board is comprised of a single layer of corrugated paper medium sandwiched between two single layer liners; double wall board has an additional corrugated paper medium and a third single layer liner; triple wall board includes a third corrugated paper medium and a fourth single layer liner. The corrugations of each medium are glued to the liners to provide structural rigidity.

Containers made from corrugated paperboard are relatively lightweight and offer good strength and stability. One benefit of corrugated paperboard is its ability to be fabricated quickly and inexpensively in comparison with containers made from other materials, such as wood or plastic. Corrugated paperboard containers also offer superb cushioning properties. It is known by those skilled in the art that, generally, corrugated board comprised of more layers or walls offer a greater ability to cushion the enclosed articles and provide greater structural rigidity. Therefore, heavy articles, such as bulk flowables or machinery, or fragile articles such as electronics, require containers made from double or triple wall board. Less fragile articles or articles having lighter weight in proportion to bulk require containers made from single-wall corrugated paperboard.

Various types and grades of paperboard are used to form the corrugated paper mediums and the liners. Paper used in the construction of the liner and corrugated medium varies in terms of paper composition, i.e., proportion of virgin pulp employed versus proportion of recycled pulp employed, and in terms of the weight of the paper (measured in pounds per thousand square feet). Choice of paper ultimately affects the strength of the corrugated paperboard, the weight of the board, and the thickness of the board. Thus, choice of material is critical in meeting the specific design criteria for a given application.

It has heretofore been recognized that when more strength, rigidity, or puncture resistance is needed, higher density liners or more layers of corrugation are required. Neither of these options, however, offers a complete solution. Higher density liners, while providing additional rigidity and puncture resistance, are generally only available to a weight of ninety pounds per thousand square feet. Additional layers of corrugation, on the other hand, while providing increased strength and rigidity, also add the drawback of increasing bulk or thickness. This is significant when one considers the cumulative effect of additional layers of corrugation when many containers are shipped within a larger shipping container.

Accordingly, there is a need in the corrugated board container industry to provide for greater strength and rigidity without significantly adding to the bulk of the container.

One essential characteristic of any corrugated paperboard is its ability to be bent or folded along predefined lines such that flat blanks, once cut to the desired shape, can be folded to define the bottom, side panels, and top of the container. Single-wall corrugated board is generally easily foldable in a direction either parallel or transverse to the direction of the corrugations of the medium. However, because the corrugations of the mediums in double and triple wall corrugated board are generally aligned in a direction parallel to one another, creating bends or folds in a direction transverse to the direction of the corrugations can prove difficult. This difficulty increases as the structural rigidity of the particular board increases.

Several solutions have been provided to enhance the foldability of corrugated board. It is well known to provide a crushed region or score line transverse to the direction of the corrugations such that the structural integrity of the corrugated medium, and thereby the board, is diminished to a point wherein the board is proportionally easier to bend along the score line. This solution is not entirely satisfactory for thick or heavy duty board, however, because the bending line is not clearly defined and may result in a bend that is unpredictable and uneven. Additionally, this method substantially weakens the container in the region of the bend. Moreover, the thick or heavy duty board will not stay in the bent position when merely a score line is used to form the bend region.

A similar solution has been provided wherein a fold region is scored, i.e., crushed in a narrow region in order to reduce resistance to bending. Although this method provides for a more predicable and defined fold, it nevertheless forces a large quantity of paper material into the interior of the fold region, thereby preventing the adjacent sides of the fold from achieving and maintaining a perpendicular relation to one another. This result is exacerbated where the blank is made from triple wall corrugated board as opposed to single or double wall board. This method also significantly reduces the strength of the container in the fold region.

A third solution has been to cut a V-shaped channel into double or triple wall board. The channel is cut into the board such that only a single wall corrugated layer composed of a medium sandwiched between two single layer liners remains at the bottom of the channel. This method solves the problem of forcing a large quantity of paper material into the interior of the fold region. However, this method introduces great difficulty in maintaining and removing the channel at exactly the appropriate depth so that sufficient material is removed to achieve the desired reduction in the force required to form a bend, but not damage the remaining materials.

Another solution has been to create a channel of square or rectangular cross section in triple wall corrugated board. Similar to the V-channel method, this method relies on removal of all but a single corrugated paper medium sandwiched between the liner that will be outermost in the completed bend and the next innermost liner. The channel is formed by wiping the adhesive from the liner in the region of the intended bend prior to forming the triple wall corrugated board. Two slits are then cut into the board through the liner that will be innermost in the completed bend and a scraper removes the material in the fold region down to the single remaining layer or wall. A scored region is then provided in the channel to facilitate bending of the final layer of board. This method provides the same advantages as the V-channel method, but, because some residual adhesive remains after wiping, also creates the same difficulties in removing the desired material without damaging the remaining material. Furthermore, the path along which the adhesive is wiped must be significantly wider than the cutout fold region, because, as the adhesive is wiped from the fold, a wave of adhesive is created which, during the assembly of the board, flows back into a portion of the wiped area. The result of creating a wiped region which is significantly wider than the cutout area is an area adjacent to the bend region that is structurally weaker than the surrounding board.

The present invention provides an improved bend region in a relatively high strength corrugated board wherein a cutout area having a generally square or rectangular cross section is formed but does not suffer from the inadequacies of the prior art. The bend region is formed by cutting all but the outermost single wall from the corrugated board. Prior to applying adhesive to the corrugations to secure the walls of the board together, a selected portion of the corrugations are compressed so that the compressed corrugations do not receive any adhesive. Then all but the outermost single wall is cut in the area of the compressed corrugations to allow the remaining walls to be readily removed by a vacuum process to create the bend region. Practice of the present invention results in a corrugated board of higher strength than the prior art and yet folds as easy as the prior art corrugated boards.

BRIEF SUMMARY OF THE INVENTION

Briefly stated, the present invention is directed to a method of making corrugated board having at least one fold region comprising the steps of securing at least two sheets of paper liner in complementary facing engagement to create a first multi-layer composite liner having a first surface and a second surface. A first set of ridges of a first corrugated paper medium is secured to the second surface of the first multi-layer composite liner to create a first single-face web. At least two sheets of paper liner are secured in complementary facing engagement to create a second multi-layer composite liner having a first surface and a second surface. A first set of ridges of a second corrugated paper medium is secured to the second surface of the second multi-layer composite liner to create a second single-face web. A selected portion of the second corrugated paper medium is compressed to create an area to be bent. A second set of ridges of the first corrugated paper medium is secured to the first surface of the second multi-layer composite liner. A third liner having a first surface and a second surface is provided. The first surface of the third liner is secured to a second set of ridges on the second corrugated paper medium such that the selected portion of the second corrugated paper medium is spaced from the third liner. The first multi-layer composite liner, the first corrugated paper medium, the second multi-layer composite liner and at least part of the selected portion of the second corrugated paper medium are cut to form a cutout area which is aligned with the area to be bent. The cutout area is then removed from the corrugated board. Another aspect of the present invention includes securing a first set of ridges of a third corrugated paper medium to the second surface of the third liner, and a second set of ridges of the third corrugated paper medium to a fourth liner.

Another aspect of the present invention is directed to a method of making corrugated board which comprises the steps of securing at least two sheets of paper liner in complementary facing engagement to create a first multi-layer composite liner having a first surface and a second surface. A first set of ridges of a first corrugated paper medium is secured to the second surface of the first multi-layer composite liner to create a first single-face web. At least two sheets of paper liner are secured in complementary facing engagement to create a second multi-layer composite liner having a first surface and a second surface. The first surface of the second multi-layer composite liner is secured to a second set of ridges on the first corrugated paper medium, thereby forming a single-wall corrugated board. This aspect of the present invention could also be directed to a method of making corrugated board which comprises the additional steps of securing a second corrugated paper medium and a third liner to the single-wall corrugated board, thereby creating a double-wall corrugated board. This aspect of the present invention could also be directed to a method of making corrugated board which comprises the additional steps of adding a third corrugated paper medium and fourth liner to the double-wall corrugated board, thereby making a triple-wall corrugated board.

Another aspect of the present invention is directed to a corrugated board which comprises at least two paper liners secured in complementary facing engagement to form a first multi-layer composite liner. At least two paper liners are secured in complementary facing engagement to form a second multi-layer composite liner. The corrugated board further includes a corrugated paper medium having corrugations defining a first set of ridges and a second set of ridges. The first set of ridges are secured to the first multi-layer composite liner and the second set of ridges are secured to the second multi-layer composite liner.

Another aspect of the present invention is directed to a corrugated board container which comprises a panel configured to define an interior enclosure. The panel is comprised of at least two paper liners secured in complementary facing engagement to form a first multi-layer composite liner. At least two paper liners are secured in complementary facing engagement to form a second multi-layer composite liner. The panel also includes corrugated paper medium having corrugations defining a first set of ridges and a second set of ridges. The first set of ridges is secured to the first multi-layer composite liner and the second set of ridges is secured to the second multi-layer composite liner.

Another aspect of the present invention is directed to a corrugated board which comprises a first paper liner, a second paper liner, and a corrugated paper medium having corrugations defining a first set of ridges and a second set of ridges. The first set of ridges is secured to the first paper liner and the second set of ridges is secured to the second paper liner. At least one of the paper liners is a multi-layer composite liner comprising at least two paper liners secured in complementary facing engagement.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 8 is a greatly enlarged perspective view, partially in cross section, of the corrugated board shown in FIG. 5 taken along lines 8—8 of FIG. 5;

FIG. 9 is a greatly enlarged perspective view, partially in cross section, of the corrugated board shown in FIG. 5 taken along lines 9—9 of FIG. 5;

FIG. 10 is a greatly enlarged perspective view, partially in cross section, of the corrugated board shown in FIG. 5 taken along lines 10—10 of FIG. 5;

FIG. 11 is a greatly enlarged perspective view, partially in cross section, of the corrugated board shown in FIG. 5 taken along lines 11—11 of FIG. 5;

DETAILED DESCRIPTION OF THE INVENTION

Figure 1:
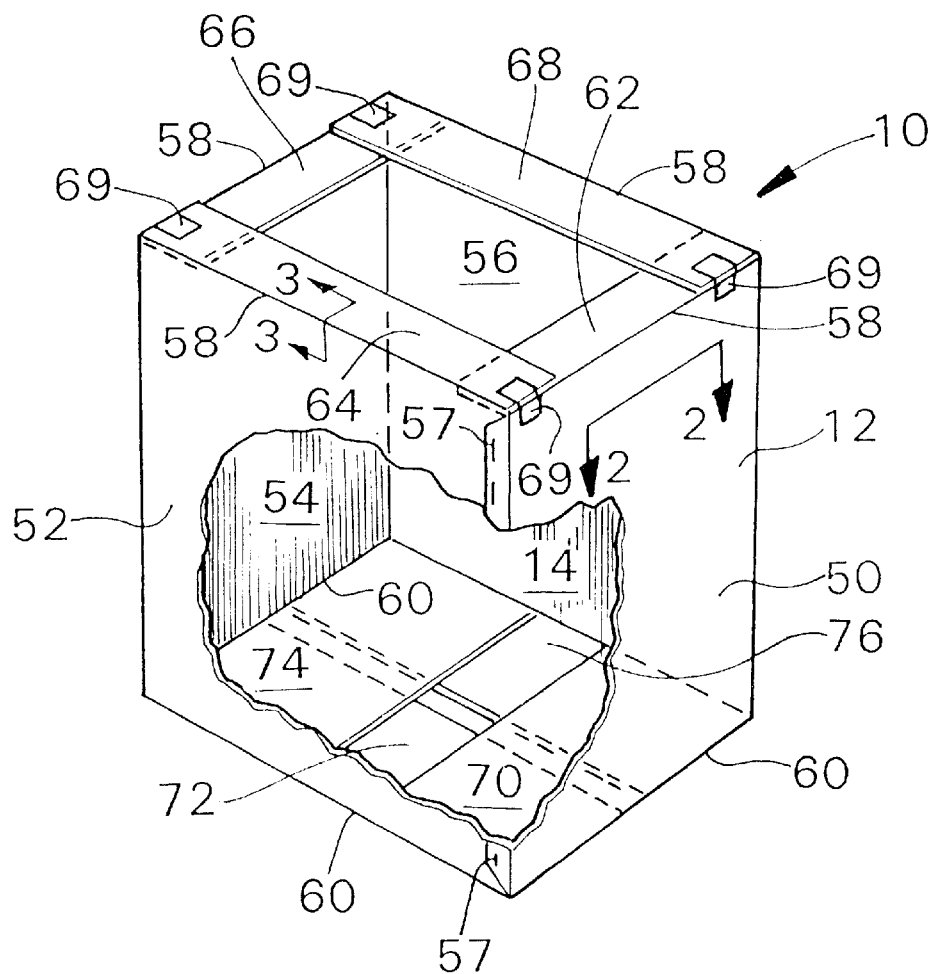
FIG. 1 is a top perspective view, partially broken away, of a corrugated board container in accordance with the present invention.

Certain terminology is used in the following description for convenience only and is not limiting. The words "right," "left," "lower," and "upper," designate directions in the drawings to which reference is made. The words "inwardly" and "outwardly" refer to directions toward and away from, respectively, the geometric center of the cardboard container, the apparatus for making the same and designated parts thereof. The terminology includes the words above specifically mentioned, derivatives thereof and words of similar import.

Figure 2:
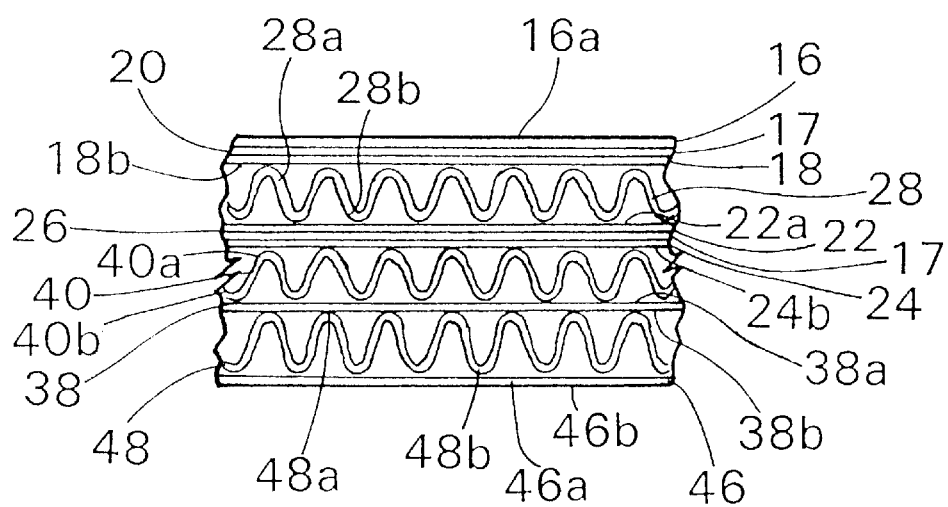
FIG. 2 is a greatly enlarged cross-sectional view of a portion of the corrugated board container shown in FIG. 1 taken along lines 2—2 of FIG. 1.

Referring to the drawings in detail, wherein like numerals are used to indicate like elements throughout, there is shown in FIG. 1 a corrugated board container, generally designated 10, in accordance with the present invention. The container 10 includes a panel 12 configured to define an interior enclosure 14. As is best shown in FIG. 2, the panel 12 is comprised of at least two paper liners 16, 18. The two paper liners 16, 18 are secured in complementary facing engagement to form a first multi-layer composite liner 20 having a first surface 16a and a second surface 18b. Paper liners of the type used herein are well known in the art and may have a weight in the range of 26 to 90 pounds per thousand square feet (pounds per msf). Accordingly, further description thereof is omitted for purposes of brevity and convenience only and is not limiting.

In the preferred embodiment of the present invention the weight of the two liners 16, 18 which are secured in complementary facing engagement is preferably selected to provide the first multi-layer composite liner 26 with structural integrity. Preferably, the liners 16, 18 weigh about sixty-nine pounds per msf. However, it is understood by those of ordinary skill in the art from this disclosure that the present invention is not limited to constructing the liners 16, 18 of any particular weight, as the weight used is selected in accordance with the application of the container 10. Moreover, it is also understood by those of ordinary skill in the art that the first multi-layer composite liner 20 could be constructed of three or more liners (not shown) without departing from the spirit and scope of the invention. For instance, if three liners were used, each could weigh forty-two pounds per msf.

Preferably, the two or more liners 16, 18 comprising the first multi-layer composite liner 20 are secured to one another using an adhesive 17. The adhesive 17 is preferably of the type which is compatible with paperboard and bonds with and forms a part of the paperboard such that the adhesive becomes indistinguishable to the human eye. The adhesive 17 is shown in FIG. 2 for illustration only. In the present embodiment, it is preferred that the adhesive 17 be a polymeric material, such as polyethylene, although other adhesives known in the art may be used and include starch adhesives. The amount of adhesive 17 used to secured the liners 16, 18 together is known to those of ordinary skill in the art and varies with the particular application. In the preferred embodiment, the sixty-nine pounds per msf paper liners 16, 18 are preferably secured together using about six pounds per msf of polyethylene, resulting in a multi-layer composite liner weighing about one hundred forty-four pounds per msf.

The method in which the liners 16, 18 are secured together using the adhesive 17 to form the first multi-layer composite liner 20 is well understood by those of ordinary skill in the art. Accordingly, further description thereof is omitted for purposes of convenience only, and is not limiting. The first multi-layer composite liner 20 is an off-the-shelf item available from Fiber-Lam, Inc., located in Doswell, Va.

A second multi-layer composite liner 26 is formed by securing in complementary facing engagement at least two paper liners 22 and 24 using the adhesive 17. The second multi-layer composite liner 26 has a first surface 22a and a second surface 24b. It will be understood by those of ordinary skill in the art that the second multi-layer composite liner 26 and each multi-layer composite liner described hereinafter can be formed in the manner described in detail above in connection with the first multi-layer composite liner 20.

With reference to FIG. 2, there is shown a first corrugated paper medium 28, having corrugations defining a first set of ridges 28a and a second set of ridges 28b. The first set of ridges 28a of the first corrugated paper medium 28 is secured to the second surface 18b of the first multi-layer composite liner 20. The second set of ridges 28b is secured to the first surface 22a of the second multi-layer composite liner 26, thereby forming a single-wall corrugated board (although further layers are shown in FIG. 2, as discussed below, omission of the further layers results in a single-wall corrugated board). It is preferred that the first and second sets of ridges 28a, 28b of the first corrugated paper medium 28 (and the ridges described hereinafter) be secured to the first and second multi-layer composite liners 20, 26 using the same adhesives as that discussed above in connection with the first multi-layer composite liner 20.

It is understood by those of ordinary skill in the art that the first corrugated paper medium 28 is available in various compositions, weights, and with a variety of different corrugation configurations. The two basic types of paper medium employed in the construction of corrugated board are (1) one hundred percent recycled and (2) "semi-chem". Semi-chem contains a certain percentage of virgin paper pulp. In the present embodiment, the first corrugated paper medium 28 employed is preferably thirty-six pounds per msf semi-chem paper. However, it is understood by those of ordinary skill in the art that the present invention is not limited to constructing the first paperboard corrugated medium 28 of any particular material.

Referring again to FIG. 2, the corrugated board container 10 may be constructed from a panel 12 comprising double wall corrugated board. In this configuration, a third single-layer liner 38 is formed in a conventional manner having first and second surfaces 38a, 38b, respectively. A second corrugated paper medium 40 having corrugations defining a first set of ridges 46a and a second set of ridges 40b is secured at its first set of ridges 40a to the second surface 24b of the second multi-layer composite liner 26 and at its second set of ridges 40b to the first surface 38a of the third liner 38 to form double-wall corrugated board (although further layers are shown in FIG. 2, as discussed below, omission of the further layers results in a double-wall corrugated board).

It is understood by those of ordinary skill in the art that the present invention is not limited to the exclusive use of a particular combination of multi-layer composite liners and single-layer liners, and that all multi-layer liners could be used or all single-layer liners could be used, depending on the desired strength of the corrugated board. For instance, the panel 12 could be constructed from double wall corrugated board comprised of sixty-nine pounds per msf first single-layer paper liner 16, thirty-six pounds per msf semi-chem first corrugated paper medium 28, one hundred forty-four pounds per msf second multi-layer composite liner 26, thirty-six pounds per msf semi-chem second corrugated paper medium 40, and one hundred forty-four pounds per msf third multi-layer liner 38 (not shown).

Figure 3:
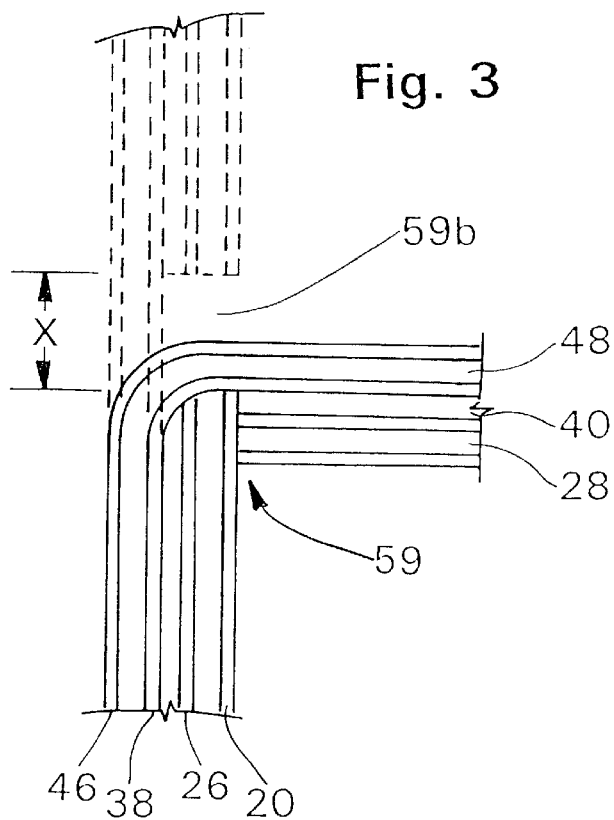
FIG. 3 is a greatly enlarged cross-sectional view of a portion of the corrugated board container shown in FIG. 1 taken along lines 3—3 of FIG. 1.

In the preferred embodiment shown in FIGS. 1–3, the corrugated board container 10 is constructed from a panel 12 comprising triple wall corrugated board. A fourth single-layer liner 46 is formed in a conventional manner and has first and second surfaces 46a, 46b, respectively. A third corrugated paper medium 48 having corrugations defining a first set of ridges 48a and a second set of ridges 48b is secured at its first set of ridges 48a to the second surface 38b of the third liner 38 and at its second set of ridges 48b to the first surface 46a of fourth liner 46.

As mentioned above, it is understood by those of ordinary skill in the art that the present invention is not limited to the exclusive use of a particular combination of multi-layer composite liners and single-layer liners, and that all multi-layer liners could be used or all single-layer liners could be used, depending on the desired strength of the corrugated board. For instance, the panel 12 could be constructed from triple wall corrugated board comprised of sixty-nine pounds per msf first single-layer paper liner 16, thirty-six pounds per msf semi-chem first corrugated paper medium 28, ninety pounds per msf second single-layer paper liner 26, thirty-six pounds per msf second corrugated paper medium 40, one hundred forty-four pounds per msf third multi-layer composite liner 38, thirty-six pounds per msf semi-chem third corrugated paper medium 48, and one hundred forty-four pounds per msf fourth multi-layer composite liner 46 (not shown). Alternatively, the panel 12 could be constructed from triple wall corrugated board comprised of sixty-nine pounds per msf first single-layer paper liner 16, thirty-six pounds per msf semi-chem first corrugated paper medium 28, sixty-nine pounds per msf second single-layer paper liner 26, thirty-six pounds per msf second corrugated paper medium 40, one hundred forty-four pounds per msf third multi-layer composite liner 38, thirty-six pounds per msf semi-chem third corrugated paper medium 48, and one hundred forty-four pounds per msf fourth multi-layer composite liner 46 (not shown).

Figure 4:
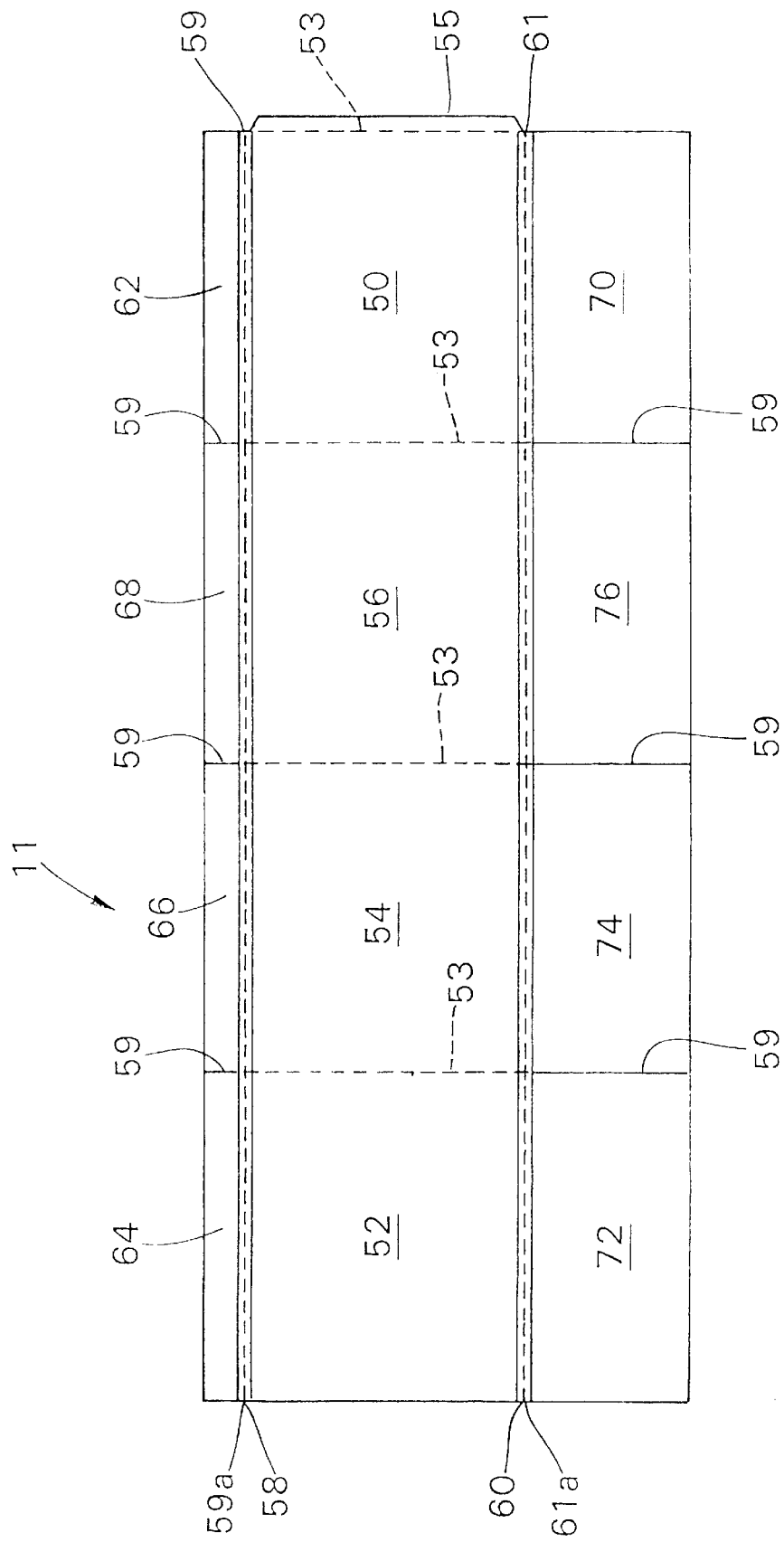
FIG. 4 is a top plan view of a corrugated board blank used for forming the corrugated board container shown in FIG. 1.

Referring now to FIGS. 1 and 4, in the preferred embodiment, when the panel 12 is assembled in the form of the container 10, it includes a first subpanel 50, a second subpanel 52 extending generally perpendicularly from the first subpanel 50, a third subpanel 54 extending generally perpendicularly from the second subpanel 52, and a fourth subpanel 56 extending generally perpendicularly between the first subpanel 50 and the third subpanel 54 such that the first, second, third, and fourth subpanels, 50, 52, 54, 56, are generally in the form of a parallelogram in cross section. Each of the first, second, third, and fourth subpanels 50, 52, 54, 56, respectively, is generally in the form of a parallelogram in plan view and has a first or upper edge 58 and second or lower edge 60.

The panel 12 further includes a first top panel 62 extending from the first edge 58 of the first subpanel 50 toward the third subpanel 54 generally perpendicular with respect to the first subpanel 50. A second top panel 64 extends from the first edge 68 of the second subpanel 52 toward the fourth subpanel 56 generally perpendicularly with respect to the second subpanel 52. A third top panel 66 extends from the first edge 58 of the third subpanel 54 toward the first subpanel 50 generally perpendicularly with respect to the third subpanel 54. A fourth top panel 68 extends from the first edge 58 of the fourth subpanel 56 toward the second subpanel 52 generally perpendicularly with respect to the fourth subpanel 56. The second top panel 64 partially overlaps the first top panel 62 and the third top panel 66. The fourth top panel 68 partially overlaps the first top panel 62 and the third top panel 66. Those of ordinary skill in the art understand from this disclosure that an alternative configuration would place the first and third top panels 62, 66 in overlapping relation to the second and fourth top panels 64, 68.

To hold the first, second, third, and fourth top panels 62, 64, 66, 68 in position, at least two of the first, second, third, and fourth top panels 62, 64, 66, 68 are secured to at least one of the first, second, third, and fourth subpanels 50, 52, 54, 56. It is preferred that the first, second, third, and fourth top panels 62, 64, 66, 68 are secured in position using adhesive-faced tape. More particularly, an appropriate length of adhesive-faced tape 69 is secured between (1) the first subpanel 50 and one end of the second and fourth top panels 64, 68, and (2) the third subpanel 54 and the other end of the second and fourth top panels 64, 68. Those of ordinary skill in the art will recognize, however, that other means of securing can be used (such as stitching or stapling), and are well known to those of ordinary skill in the art.

In the present embodiment the first, second, third, and fourth top panels 62, 64, 66, 68 are constructed of the same material and in the same manner as the first, second, third, and fourth subpanels 50, 52, 54, 56. Those of ordinary skill in the art recognize that the first, second, third, and fourth top panels 62, 64, 66, 68 need not be constructed in the same manner as the first, second, third, and fourth subpanels 50, 52, 54, 56. Alternatives include constructing the first, second, third, and fourth top panels 62, 64, 66, 68 from fewer layers of corrugation than the first, second, third, and fourth subpanels 50, 52, 54, 56. Moreover, it is within the spirit and scope of the invention to omit the first, second, third, and fourth top panels 62, 64, 66, 68, or to construct the same separately from the first, second, third, and fourth subpanels 50, 52, 54, 56.

Referring now to FIG. 3, in the preferred embodiment of the present invention a first bend region, generally designated 59, is formed along the first edge 58 of the first, second, third, and fourth subpanels 50, 52, 54, 56 to permit the first, second, third, and fourth top panels 62, 64, 66 and 68 to fold to the generally perpendicular position shown in FIG. 1. The first bend region 59 is formed by removing a portion of the first multi-layer composite liner 20, second multi-layer composite liner 26, first corrugated paper medium 28, and second corrugated paper medium 40 from the first, second, third, and fourth subpanels 50, 52, 54, 56 along the entire length of first edge 58, thereby creating a bend line between the first, second, third, and fourth subpanels 50, 52, 54, 56 and the first, second, third, and fourth top panels, 62, 64, 66, 68, respectively. It is recognized by those of ordinary skill in the art that the material removed to form the first bend region 59 may be removed virtually entirely from the subpanels, 50, 52, 54, 56, virtually entirely from the top panels, 62, 64, 66, 68, or a portion may be taken from both the subpanels, 50, 52, 54, 56, and top panels 62, 64, 66, 68 to make up the first bend region 59. Preferably, the first bend region 59 includes a first score line 59a (not shown in FIG. 3) to reduce resistance to folding and provide a straighter bend, as shown in FIG. 4 and described in more detail hereinafter.

More particularly, a channel-shaped portion 59b of the first multi-layer composite liner 20, second multi-layer composite liner 26, first corrugated paper medium 28, and second corrugated paper medium 40 is removed from the first, second, third, and fourth subpanels 50, 52, 54, 56. The channel-shaped portion has a width X. The width X of the channel-shaped portion 59b is selected to be generally equal to the thickness of the first multi-layer composite liner 20, second multi-layer composite liner 26, first corrugated paper medium 28, and second corrugated paper medium 40 of the first, second, third, and fourth subpanels 50, 52, 54, 56. Thus, when the top panels 62, 64, 66, 68 are folded to the generally perpendicular position, the channel-shaped portion 59b is substantially filled with the first multi-layer composite liner 20, second multi-layer composite liner 26, first corrugated paper medium 28, and second corrugated paper medium 40, as shown in FIG. 3.

Referring again to FIG. 1, the panel 12 further includes a first bottom panel 70 extending from the second edge 60 of the first subpanel 50 toward the third subpanel 54 generally perpendicularly with respect to the first subpanel 50. A second bottom panel 72 extends from the second edge 60 of the second subpanel 52 toward the fourth subpanel 56 generally perpendicularly with respect to the second subpanel 52. A third bottom panel 74 extends from the second edge 60 of the third subpanel 54 toward the first subpanel 50 generally perpendicularly with respect to the third subpanel 54. A fourth bottom panel 76 extends from the second edge 60 of the fourth subpanel 56 toward the second subpanel 52 generally perpendicularly with respect to the fourth subpanel 56.

Preferably, the first, second, third, and fourth bottom panels 70, 72, 74, 76 are constructed in the same manner as the first, second, third, and fourth subpanels 50, 52, 54, 56. Those of ordinary skill in the art recognize from this disclosure that the first, second, third, and fourth bottom panels, 70, 72, 74, 76, need not be constructed in the same manner as the first, second, third, and fourth subpanels, 50, 52, 54, 56. Alternatives include constructing the first, second, third, and fourth bottom panels, 70, 72, 74, 76, from fewer layers of corrugation than the first, second, third, and fourth subpanels, 50, 52, 54, 56. Moreover, it is within the spirit and scope of the invention to omit the first, second, third, and fourth bottom panels, 70, 72, 74, 76, or to construct the same separately from the first, second, third, and fourth subpanels, 50, 52, 54, 56.

A second bend region 61 (shown in FIG. 4) is formed along the second edge 60 of the first, second, third, and fourth subpanels, 50, 52, 54, 56, to permit the first, second, third, and fourth bottom panels, 70, 72, 74, 76, to fold to the generally perpendicular position shown in FIG. 1. The second bend region 61 is formed generally identically to that described above in connection with the first bend region 59. Preferably, the second bend region 61 includes a first score line 61a (not shown in FIG. 3) to reduce resistance to folding and provide a straighter bend, as shown in FIG. 4 and described in more detail hereinafter. Adhesive tape (not shown) is then applied between the bottom panels 70, 72, 74, 76 and the subpanels 50, 52, 54, 56 in a conventional manner to hold the bottom panels 70, 72, 74, 76 in place.

As shown in FIG. 2, it is preferred that the first set of ridges 40a of the second corrugated paper medium 40 extend generally parallel with respect to first set of ridges 28a of first corrugated paper medium 28, in the construction of double wall corrugated board. Additionally, in the construction of triple wall corrugated board, it is also preferred that first set of ridges 48a of third corrugated paper medium 48 extend generally parallel with respect to first set of ridges 28a, 40a of the first and second corrugated paper mediums 28, 40, respectively. Accordingly, the first and second bend regions 59, 61 extend generally perpendicular with respect to the first and second set of ridges 40a, 40b of the second corrugated paper medium 40. It is preferred that the first and second bend regions 59, 61 extend generally transverse to the first and second set of ridges 40a, 40b of the second corrugated paper medium 40 because folding the panel 12 in this direction is difficult if not impossible for conventional machinery without the first and second bend regions 59, 61. However, it is understood by those of ordinary skill in the art that the present invention is not limited to compressing the corrugated paper mediums in a direction transverse to the ridges and that the corrugated paper mediums could be compressed in a direction parallel to the ridges (not shown) without departing from the spirit and scope of the invention.

FIG. 4 shows a blank 11 for forming the container 10. The blank 11 includes the first, second, third, and fourth subpanels 50, 52, 54, 56; first, second, third, and fourth top panels 62, 64, 66, 68; and first, second, third, and fourth bottom panels 70, 72, 74, 76, respectively, as described above. Score lines 53 are provided between the second and third subpanels 52, 54; third and fourth subpanels 54, 56; and fourth and first subpanels 56, 50, respectively, to permit the first, second, third, and fourth subpanels 50, 52, 54, 56 to be folded to the generally perpendicular position shown in FIG. 1. A securing flap 55 extends from the first subpanel 50. Another score line 53 is provided between the securing flap 55 and the first subpanel 50 to allow the securing flap 55 to be folded to a generally perpendicular position with respect to the first subpanel 50. When the first, second, third, and fourth subpanels 50, 52, 54, 56 are folded as shown in FIG. 1, staples or stitches 57 and/or a glue are used to attach the securing flap 55 to the second subpanel 52 (see FIG. 1) in a manner well understood by those of ordinary skill in the art. Cut lines 59 are provided between the second and third top panels 64, 66; third and fourth top panels 66, 68; fourth and first top panels 68, 62, second and third bottom panels 72, 74, third and fourth bottom panels 74, 76, and fourth and first bottom panels 76, 70.

To assemble the container 10, first the first, second, third, and fourth subpanels 50, 52, 54, 56 and securing flap 55 are folded to the generally parallelepiped position shown in FIG. 1. The stitching 57 and/or glue are applied to attach the securing flap 55 to the second subpanel 52. The top and bottom panels 62, 64, 66, 68, 70, 72, 74, 76 are then folded against the longitudinal directions of the first, second and third corrugated paper mediums 28, 40, 38 to the position shown in FIG. 1 and secured using adhesive tape. The first and second bend regions 59, 61 and score lines 59a, 61a permit the top and bottom panels 62, 64, 66, 68, 70, 72, 74, 76 to be easily folded. Bend regions are not necessary in place of the score lines 53 because these bends are in the direction of the first, second and third corrugated paper mediums 28, 40, 38, as is well understood by those of ordinary skill in the art.

Figure 5:
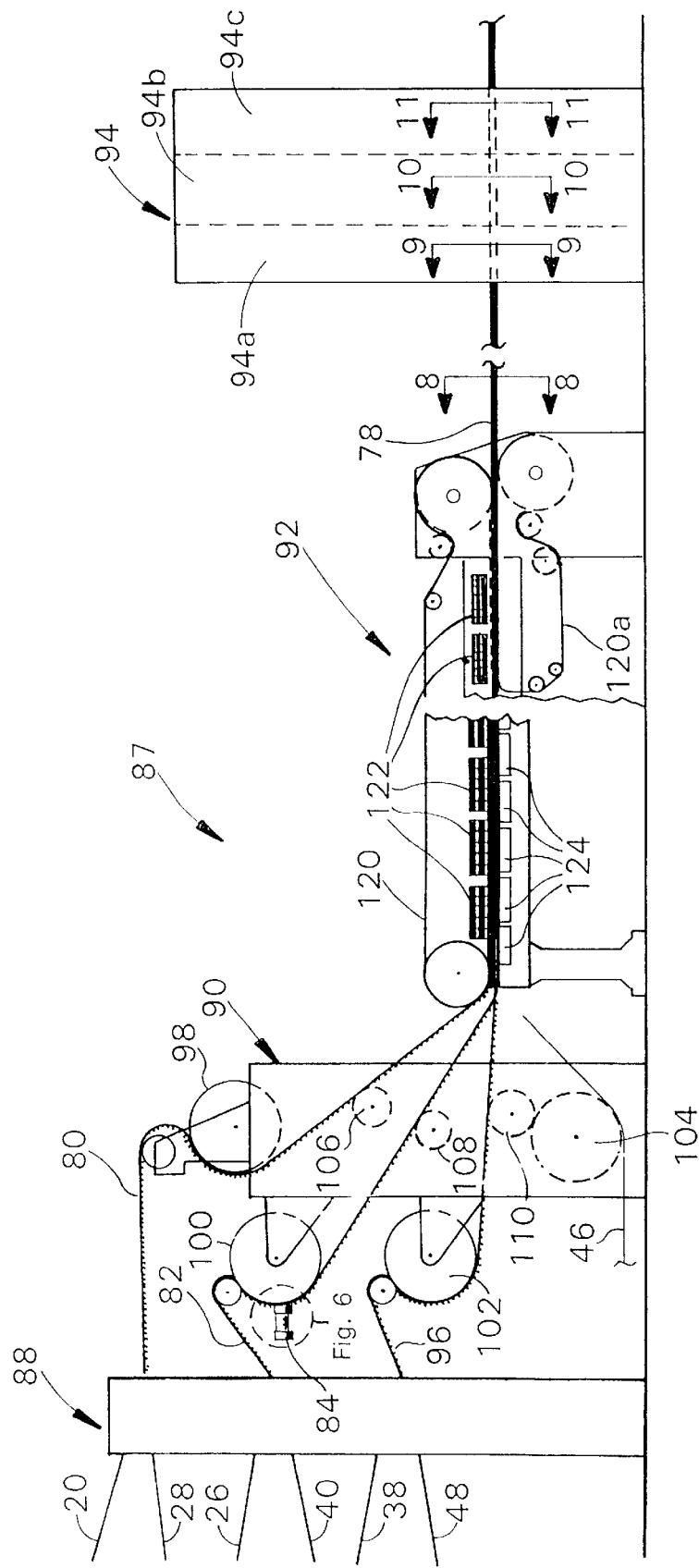
FIG. 5 is a partially schematic side-elevational view of an apparatus for making the corrugated board blank shown in FIG. 4.

FIG. 5 shows a machine, generally designated 87, for assembling triple-wall corrugated board having at least one fold region. The machine 87 shown is comprised of four stations: (1) single-face web assembly station 88; (2) preheat and adhesive application station 90; (3) compression and curing station 92; and (4) slitting, scoring, and removal station 94, each of which is schematically shown. First, second, third, and fourth liners, 20, 26, 38, 46, are commercially available, as described above, preassembled into multi-layer composite liners. Their assembly, therefore, is not shown as part of the process depicted in FIG. 5. It is understood by those of ordinary skill in the art, from reading this description, that the first, second, and third liners 20, 26, 38, enter the single-face web assembly station 88 in their commercially available multi-layer composite liner form. Similarly, the fourth liner 46 enters preheat and adhesive application station 90 in its commercially available multi-layer composite liner form. It is also understood by those of ordinary skill in the art that first, second, and third corrugated paper mediums, 28, 40, 48, are commercially available in their uncorrugated forms. First, second, and third corrugated paper mediums, 28, 40, 48, in the present embodiment, enter single-face web assembly station 88 in their uncorrugated form.

Referring now to FIGS. 2 and 5, the first multi-layer composite liner 20 enters the single-face web assembly station 88 in spaced complementary facing juxtaposition with first corrugated paper medium 28 in uncorrugated form. In a process which is well known to those of ordinary skill in the art, the first corrugated paper medium 28 is corrugated, providing thereon a first set of ridges 28a and a second set of ridges 28b, as best shown in FIG. 2. The first set of ridges 28a of the first corrugated paper medium 28 is secured to the second surface 18b, again, as best shown in FIG. 2, of the first multi-layer composite liner 20 using an adhesive (not shown) to create a first single-face web 80. It is understood by those of ordinary skill in the art that a single-face web is generally comprised of a paper liner to which a corrugated paper medium is attached. The single-face web assembly station 88 is a conventional machine well understood by those of ordinary skill in the art. Accordingly, further description thereof is omitted for convenience and brevity only and is not limiting.

Generally simultaneously, the second multi-layer composite liner 26 enters the single-face web assembly station 88 in spaced, facing juxtaposition with the second corrugated paper medium 40 in uncorrugated form. The second corrugated paper medium 40 is corrugated within the single-face web assembly station 88 in the manner described above, providing a first set of ridges 40a and second set of ridges 40b, as best shown in FIG. 2. The first set of ridges 40a of the second corrugated paper medium 40 is attached to the second surface 24b of the second multi-layer composite liner 26 to create a second single-face web 82. Generally simultaneously, the third liner 38 enters single-face web assembly station 88 in spaced, facing juxtaposition with third corrugated paper medium 48 in uncorrugated form. The third corrugated paper medium 48 is corrugated within the single-face web assembly station 88, as described 10 above, providing a first set of ridges 48a and a second set of ridges 48b, as best shown in FIG. 2. The first set of ridges 48a of the third corrugated paper medium 48 is attached to a second surface 38b of the third liner 38 to create a third, single-face web 96. First, second, and third single-faced webs 80, 82, 96, exit single-face web assembly station 88 in spaced, facing juxtaposition.

Referring now to FIG. 5, the preheat and adhesive application station 90 includes first, second, third and fourth preheating rollers, 98, 100, 102, 104. The first single-face web 80, second single-face web 82, third single-face web 96, and fourth liner 46 enter the preheat and adhesive application station 90 in spaced, facing juxtaposition and are, respectively, in rolling contact with the first, second, third, and fourth preheating rollers, 98, 100, 102, 104. Except as described below, the preheat and adhesive application station 90 and the first, second, third, and fourth preheating rollers, 98, 100, 102, 104 are well understood by those of ordinary skill in the art and, accordingly, a detailed description thereof is omitted for purposes of convenience only and is not limiting.

Figure 6:
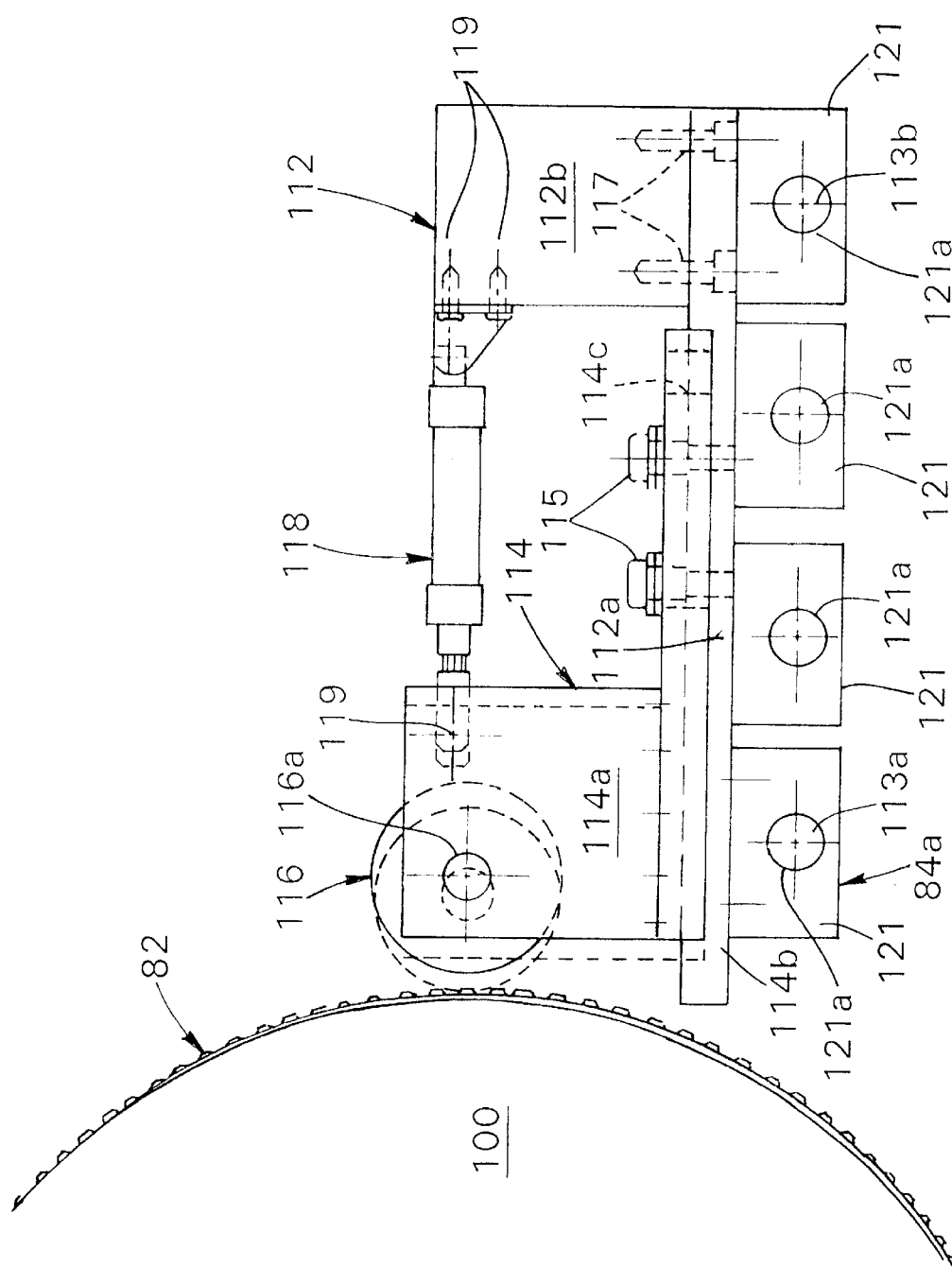
FIG. 6 is a greatly enlarged rear fragmentary view of a portion of the apparatus shown in FIG. 5.
Figure 7:
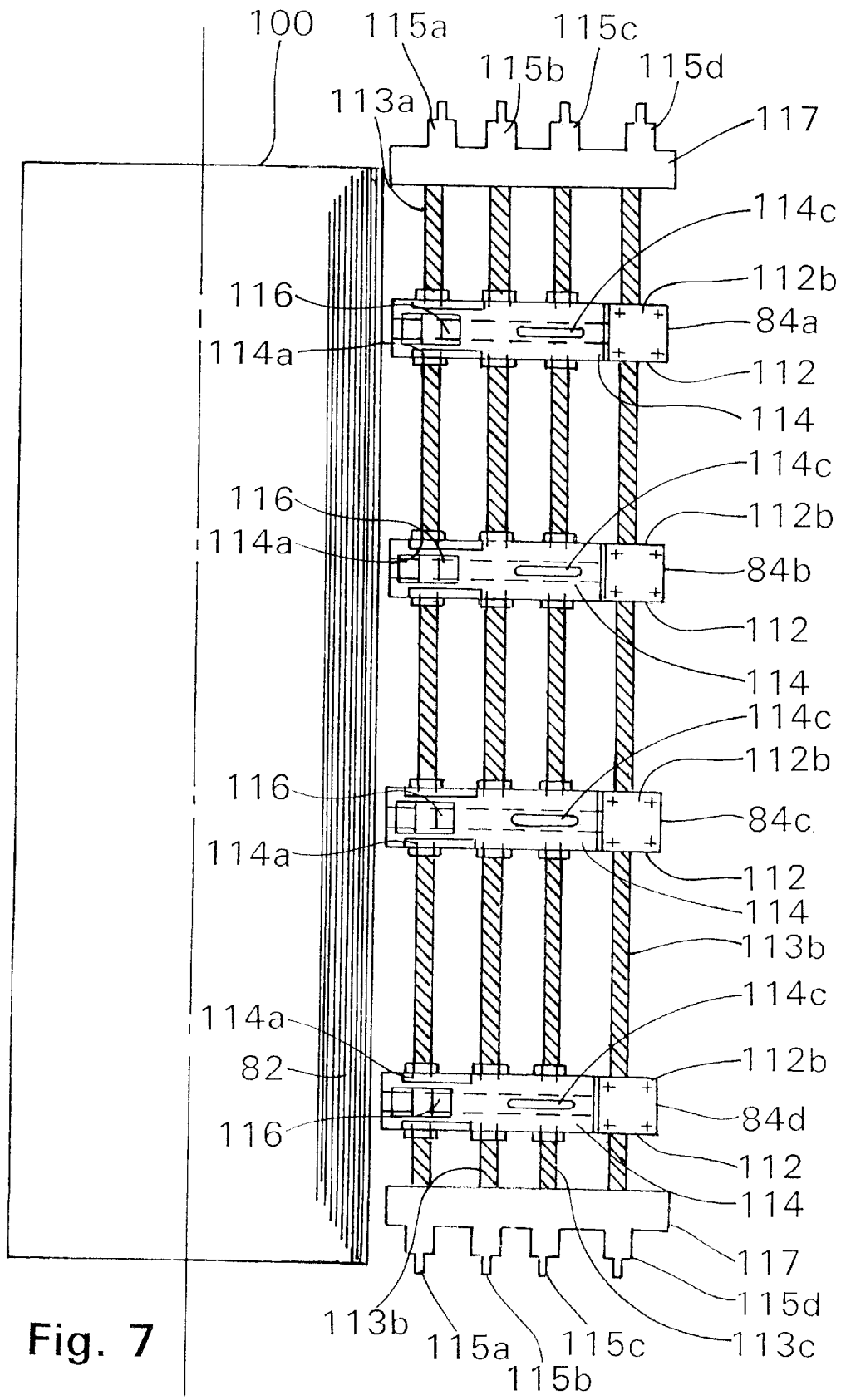
FIG. 7 is an inverted top plan view of FIG. 6.

Referring now to FIGS. 5–7, in the preferred embodiment, the first bend region 59 and the second bend region 61 are formed by compressing a selected portion of the second corrugated paper medium 40 through the action of first and second retractable crush roller assemblies 84a, 84b to form an area to be bent. As is best shown in FIG. 6, the first retractable crush roller assembly 84a is positioned just upstream of the preheat and adhesive application station 90 and is positioned to compress the second set of ridges 40b of the second corrugated paper medium 40. The first crush roller assembly 84a comprises a crush roller 116 which is movable into and out of engagement with the second corrugated paper medium 40. The crush roller 116 is shown in the retracted position in solid lines and in the engaged position in phantom in FIG. 6.

The crush roller 116 is rotatably mounted on a bracket 114a of a sliding mount 114 via a pin 116a. The sliding mount 114 includes a generally horizontal support block 114b which is slidably disposed on a generally horizontal leg 112a of a frame 112. That is, the support block 114b includes a slot 114c through which extends a pair of bolts 115. The bolts 115 are threadably secured to the horizontal leg 112a of the frame 112 to provide the sliding mount 114 with linear sliding motion.

An actuator 118 extends between the bracket 114a of the sliding mount 114 and a bearing block 112b which extends generally perpendicularly from the horizontal leg 112a. The bearing block 112b is preferably secured to the horizontal leg 112a with suitable standard fasteners, such as threaded bolts 117. The actuator 118 provides sliding movement of the sliding mount 114 with respect to frame 112, thereby providing movement of crush roller 116 inwardly and outwardly to either be engaged with or retracted from the second single-face web 82, as it passes over second preheating roller 100. The actuator 118 is preferably secured to the support block 112 and bracket 114a with standard fasteners, such as screws 119. In the preferred embodiment the actuator 118 is comprised of linear pneumatically actuated piston and cylinder assembly. However, it is understood by those of ordinary skill in the art that other actuators could be used without departing from the spirit and scope of the invention. For instance, a screw and nut rotary to linear motion actuator (not shown) could be used.

The crush roller 116 preferably has a width which is slightly wider than the width X of the channel-shaped portion 59b. This prevents the possibility of adhesive being applied to the second set of ridges 40b of the second corrugated paper medium 40 near the channel-shaped portion 59b and allows for easy removal of the cut out portion of the first multi-layer composite liner 20, second multi-layer composite liner 26, first corrugated paper medium 28, and second corrugated paper medium 40, as described in more detail hereinafter. Generally, the crush roller 116 should have a width about two times the width X.

As is best shown in FIG. 7, since first and second bend regions 59, 61 are formed in the container 10, a corresponding number of first, second, third, and fourth retractable crush roller assemblies, 84a, 84b, 84c, 84d, are movably mounted on first, second, third, and fourth positioning rods 113a, 113b, 113c, 113d to provide the preheat and adhesive application station 90 with the ability to form the first bend region 59 and the second bend region 61 simultaneously in two panels 12 (not shown), thereby doubling output capacity. The first, second, third, and fourth positioning rods 113a, 113b, 113c, 113d are mounted between a pair of frame members 117 which support the first, second, third, and fourth positioning rods 113a, 113b, 113c, 113d in a stationary position but yet allow each of the first, second, third, and fourth positioning rods 113a, 113b, 113c, 113d to rotate. Each of the first, second, third, and fourth positioning rods 113a, 113b, 113c, 113d is externally threaded such that rotation of the the first, second, third, and fourth positioning rods 113a, 113b, 113c, 113d results in linear translation of the first, second, third, and fourth retractable crush roller assemblies, 84a, 84b, 84c, 84d along first, second, third, and fourth positioning rods 113a, 113b, 113c, 113d, as described below. The frame members 117 are secured to the machine 87 in a conventional manner well understood by those of ordinary skill in the art. The first, second, third, and fourth positioning rods 113a, 113b, 113c, 113d extend generally parallel to each other and generally transverse to the direction of travel of the panel 12 through the machine 87. The second, third, and fourth crush roller assemblies 84b, 84c, 84d are generally identical to the first crush roller assembly 84a.

Each crush roller assembly 84a, 84b, 84c, 84d can be positioned anywhere along the first, second, third, and fourth positioning rods 113a, 113b, 113c, 113d and locked in place to accommodate different size panels 12. That is, each crush roller assembly 84a, 84b, 84c, 84d includes four bearings 121, each having an aperture 121a sized to complementarily receive one of the first, second, third, and fourth positioning rods 113a, 113b, 113c, 113d to permit the crush roller assemblies 84a, 84b, 84c, 84d to slidably move along the positioning rods 113a, 113b, 113c, 113d. One of the bearings 121 on each crush roller assembly 84a, 84b, 84c, 84d has an aperture 121a which is threaded to complementarily receive the external threads of the one of the first, second, third, and fourth positioning rods 113a, 113b, 113c, 113d passing therethrough. The apertures 121a of the other bearings 121 on the crush roller assemblies 84a, 84b, 84c, 84d are not threaded and, therefore, these other bearings 121 merely support the crush roller assemblies 84a, 84b, 84c, 84d. That is, the first crush roller assembly 84a is linearly translated by rotation of the first positioning rod 113a; the second crush roller assembly 84b is linearly translated by rotation of the second positioning rod 113b; the third crush roller assembly 84c is linearly translated by rotation of the third positioning rod 113c; and the fourth crush roller assembly 84d is linearly translated by rotation of the fourth positioning rod 113d. Each of the first, second, third, and fourth positioning rods 113a, 113b, 113c, 113d is respectively driven by first, second, third and fourth pairs of motors 115a, 115b, 115c, 115d mounted on the frame 113c. Thus, the linear position of the crush roller assemblies 84a, 84b, 84c, 84d is controlled by first, second, third and fourth pairs of motors 115a, 115b, 115c, 115d. The crush roller assemblies 84a, 84b, 84c, 84d are locked in position on the positioning rods 113a, 113b, 113c, 113d when the motors 115a, 115b, 115c, 115d are not rotating.

Accordingly, the first and second bend regions 59, 61 are formed by moving the crush rollers 116 inwardly into contact with second single-face web 82. As mentioned above, compressing to create the first and second bend regions 59, 61, is preferably performed along a path transverse to the direction in which the first set of ridges 40a of the second corrugated medium 40 extend. It will be recognized by those of ordinary skill in the art upon reading this disclosure that means other than a retractable crush roller assembly 84a–d may be employed to create the first bend region 59 and the second bend region 61 and the present invention is not limited to any particular number of crush roller assemblies 84a–d. For instance, the crush rollers 116 could be stationary and the second preheating roller 100 could move into engagement with the crush rollers 116 or instead of a crush roller 116 a curved blade (not shown) could crush the second set of ridges 40b of the second corrugated paper medium 40.

Referring again to FIG. 5, after contacting first, second, and third preheating rollers, 98, 100, 102, the second set of ridges 28b, 40b, 48b of first, second, and third single-faced webs, 80, 82, 96, contact first, second, and third glue rolls, 106, 108, 110, respectively. Adhesive (not shown) is applied to the second set of ridges, 28b, 40b, 48b, of the first, second, and third corrugated paper mediums, 28, 40, 48. However, because of the action of the crush rollers 116, adhesive is not applied to the selected portion of the second set of ridges 40b of the second corrugated paper medium 40. The first, second, and third single-face webs, 80, 82, 96, exit the preheat and adhesive application station 90 in spaced, facing juxtaposition.

The first, second, and third single-face webs, 80, 82, 96, and fourth liner 46 then enter the compression and curing station 92 in spaced, complementary facing juxtaposition. A first endless belt 120 and second endless belt 120a draw the first, second, and third single-face webs, 80, 82, 96, and fourth liner 46 into the compression and curing station 92, wherein compression bladders 122 force the first, second, and third single-face webs, 80, 82, 96, and fourth liner 46, into complementary facing engagement. Heat plates 124 provide heat to cure the adhesive. The compression and curing station 92 is well known to those of ordinary skill in the art, accordingly, further description thereof is omitted for purposes of convenience and brevity only and is not limiting. However, it is also understood by those of ordinary skill in the art that various methods are available to compress and cure the various individual layers into a contiguous board. For instance, instead of the bladders 122, rollers (not shown) could be used. Thus, the method of compressing and curing the panel 12 described herein is exemplary and not intended to be limiting.

When the two panels 12 exit the compression and curing station 92 in tandem, each has the initial stages of first and second bend regions 59, 61. FIG. 8 shows the first stage of one of the bend regions 59, 61 as the panel 12 exits the compression and curing station 92. Because of the crush rollers 116 a gap 126 is formed between the first surface 38a of the third liner 38 and the second set of ridges 40b of the second corrugated paper medium 40. As a result, there is no adhesive in the gap 126.

Referring now to FIG. 9, the panel 12 next enters the slitting, scoring, and cutout removal station 94 which includes a slitting substation 94a, a scoring substation 94b and a cutout removal substation 94c. FIG. 9 shows the second stage of one of the bend regions 59, 61 as the panel 12 exits the slitting substation 94a. A cutout area 86 is formed over the gap 126 in each of the first and second bend regions, 59, 61, by cutting through the first multi-layer composite liner 20, the first corrugated paper medium 28, second multi-layer composite liner 26, and at least part of the selected portion of the second corrugated paper medium 40. In the preferred embodiment of the invention, the cutout 86 is wider at the first multi-layer composite liner 20 than at the second corrugated paper medium 40 to facilitate removal of the cutout 86.

Figure 12:
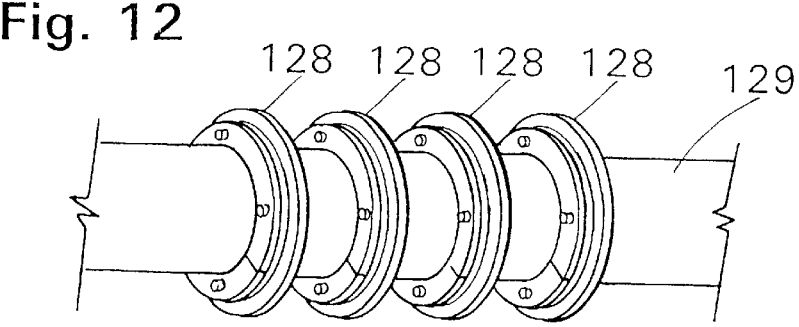
FIG. 12 is a greatly enlarged perspective view of a slitting substation which forms a portion of the apparatus shown in FIG. 5.
Figure 13:
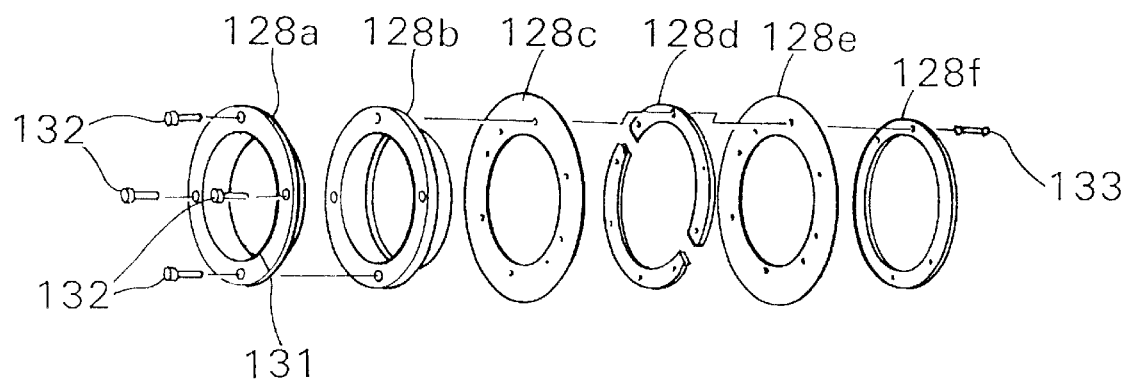
FIG. 13 is an exploded view of a portion of the slitting substation shown in FIG. 12.

Referring now to FIGS. 12 and 13, to create the cutout area 86 four pairs of cutting blade assemblies 128 are positioned on a rotatably driven shaft 129 located in the slitting substation 94 in alignment with the gaps 126. FIG. 13 shows one of the cutting blade assemblies 128 in exploded perspective view. In the preferred embodiment, each cutting blade assembly 128 comprises a clamping ring 128a, a mounting ring 128b, a first generally annular blade 128c, a split spacer ring 128d, a second generally annular blade 128e, and a support ring 128f. The clamping ring 128a secures the cutting blade assembly 128 to the shaft 129. That is, the clamping ring 128a has an internal diameter which is slightly less than the external diameter of the shaft 129. The clamping ring 128a includes a split section 131 which permits the internal diameter of the clamping ring 128a to be increased to permit the clamping ring 128a slide onto the shaft 129 and be clamped into position. The mounting ring 128b is then slipped onto the shaft 129 and secured to the clamping ring 128a using standard fasteners, such as screws 132 extending through suitably sized apertures in the clamping ring 128a into correspondingly sized threaded apertures in the mounting ring 128b. The first blade 128c, split spacer ring 128d, second blade 128e and the support ring 128f are then respectively slipped onto the shaft 129 and the mounting ring 128b and secured in place using standard fasteners, such as screws 133. The screws 133 extend through suitably sized apertures in the first blade 128c, split spacer ring 128d, second blade 128e and support ring 128f into correspondingly sized threaded apertures in the mounting ring 128b.

The first and second blades 128c, 128e extend generally parallel with respect to each other and at a distance which is generally the same as the width X. Thus, the spacer ring 128d has a width which is generally the same as the width X. The blades 128a, 128b are also positioned at a depth such that their terminal ends are located in the gaps 126 as the panel 12 moves through the slitting substation 94a. The terminal ends of the blades 128a, 128b are preferably only beveled on one side (not shown) to facilitate separation of the cut out area 86 from the rest of the panel 12. An automatic sharpener (not shown) can be included in the slitting substation 94a to maintain the sharpness of the blades 128a, 128b.

The foregoing description of the slitting substation 94a is brief because such techniques are well understood by those of ordinary skill in the art. While it is preferred that the cutout area 86 be formed by the rotating the first and second blades 128c, 128e, it is also understood by those of ordinary skill in the art that other methods of slitting corrugated board could be used without departing from the spirit and scope of the invention.

Referring now to FIG. 10, the panel 12 next enters the scoring substation 94b. FIG. 10 shows the third stage of the first bend region 59 as the panel 12 exits the scoring substation 94b. In the scoring substation 94b the cutout areas 86 of the panel 12 are scored along the first score line 59a and the second score line 61a. Typically scoring is accomplished by a set of pinch rollers (not shown). Scoring is a process that facilitates folding of the panel 12, removal of the cutout area 86 and is well known to those of ordinary skill in the art. Accordingly, for purposes of convenience and brevity alone, the process of scoring is not shown in detail herein.

Referring now to FIG. 11, the panel 12 next enters the cutout removal substation 94c. FIG. 11 shows the fourth stage of the first bend region 59 as the panel 12 exits the cutout removal substation 94c. In the cutout removal substation 94c the cutout areas 86 of the panel 12 are removed by a vacuum process, generally identical to that used to remove trim which is cut from the sides of the panel 12. Typically such a vacuum process involves positioning a vacuum head over the material to be vacuumed and is well understood by those of ordinary skill in the art. It is recognized by those of ordinary skill in the art that other means of removing cutout 86 may also be employed.

Each panel 12 exits the cutout removing substation 94c generally in the form shown in FIG. 4, except without the score lines 53, cut out lines 59 and the securing flap 55. The panel 12 is cut to the appropriate length and then transported to another conventional station (not shown) where the score lines 53, cut out lines 59 and the securing flap 55 are formed in the panels 12. Graphics may also be added at this conventional station and the container 10 is then folded and secured in the position shown in FIG. 1.

It will be appreciated by those skilled in the art that changes could be made to the embodiment described in detail above without departing from the broad inventive concept thereof. For instance, the use of the bend regions is equally applicable to double or triple corrugated board constructed of single-layer liners only. It is understood, therefore, that this invention is not limited to the particular embodiments disclosed, but it is intended to cover modifications within the spirit and scope of the present invention as defined by the appended claims.

We claim:

1. A method of making corrugated board, comprising the steps of:
   (a) securing at least two sheets of paper liner in complementary facing engagement to create a first multi-layer composite liner having a first surface and a second surface;
   (b) securing a first set of ridges of a first corrugated paper medium to the second surface of the first multi-layer composite liner to create a first single face web;
   (c) securing at least two sheets of paper liner in complementary facing engagement to create a second multi-layer composite liner having a first surface and a second surface;
   (d) securing the first surface of the second multi-layer composite liner to a second set of ridges on the first corrugated paper medium, thereby forming a single wall corrugated board;

(e) securing a first set of ridges of a second corrugated paper medium to the second surface of the second multi-layer composite liner;

(f) providing a third liner having a first surface and a second surface; and (g) securing the first surface of the third liner to a second set of ridges on the second corrugated paper medium thereby creating a double wall corrugated board.

2. A corrugated board constructed by the method recited in claim 1.

3. The method of making corrugated board as recited in claim 1, wherein step (g) further comprises aligning the second corrugated paper medium such that the first set of ridges of the second corrugated paper medium extend generally parallel with respect to the first set of ridges of the first corrugated paper medium.

4. The method of making corrugated board as recited in claim 1, wherein in steps (a), (c) and (f) each liner has a weight in the range of about 42 to 144 pounds per msf.

5. The method of making corrugated board as recited in claim 1, wherein in steps (a), (c) and (f) the liners are secured together using an adhesive.

6. The method of making corrugated board as recited in claim further comprising:

(h) securing a first set of ridges of a third corrugated paper medium to the second surface of the third liner;

(i) providing a fourth liner having a first surface and a second surface; and (j) securing the first surface of the fourth liner to a second set of ridges on the third corrugated paper medium thereby creating a triple wall corrugated board.

7. A corrugated board constructed by the method recited in claim 6.

8. The method of making corrugated board as recited in claim 6, wherein step (j) further comprises aligning the second and third corrugated paper mediums such that the first set of ridges of the second corrugated paper medium and the first set of ridges of the third corrugated paper medium extend generally parallel with respect to the first set of ridges of the first corrugated paper medium.

9. The method of making corrugated board as recited in claim 6, wherein in steps (a), (c), (f) and (i) each liner has a weight in the range of about 42 to 144 pounds per msf.

10. The method of making corrugated board as recited in claim 6, wherein in steps (a), (c), (f) and (i) the liners are secured together using an adhesive.

11. A method of making corrugated board having at least one fold region, comprising the steps of:

(a) securing at least two sheets of paper liner in complementary facing engagement to create a first multi-layer composite liner having a first surface and a second surface;

(b) securing a first set of ridges of a first corrugated paper medium to the second surface of the first multi-layer composite liner to create a first single face web;

(c) securing at least two sheets of paper liner in complementary facing engagement to create a second multi-layer composite liner having a first surface and a second surface;

(d) securing a first set of ridges of a second corrugated paper medium to the second surface of the second multi-layer composite liner to create a second single face web;

(e) compressing a selected portion of the second corrugated paper medium thereby creating an area to be bent;

(f) securing a second set of ridges of the first corrugated paper medium to the first surface of the second multi-layer composite liner;

(g) providing a third liner having a first surface and a second surface;

(h) securing the first surface of the third liner to a second set of ridges on the second corrugated paper medium such that the selected portion of the second corrugated paper medium is spaced from the third liner;

(i) cutting through the first multi-layer composite liner, the first corrugated paper medium, the second multi-layer composite liner and at least part of the selected portion of the second corrugated paper medium to form a cutout area which is aligned with the area to be bent; and (j) removing the cutout area from the corrugated board.

12. The method of making corrugated board as recited in claim 11, wherein in step (e) the selected portion of the second corrugated paper medium is compressed in a direction transverse to a direction in which the first set of ridges of the second corrugated medium extend.

13. The method of making corrugated board as recited in claim 11 wherein step (d) further comprises aligning the second corrugated paper medium such that the first set of ridges of the second corrugated paper medium extend generally parallel with respect to the first set of ridges of the first corrugated paper medium.

14. The method of making corrugated board as recited in claim 11, further comprising scoring the cutout area after step (i).

15. The method of making corrugated board as recited in claim 11 wherein step (h) further comprises:

(h)(1) securing a first set of ridges of a third corrugated paper medium to the second surface of the third liner;

(h)(2) providing a fourth liner having a first surface and a second surface; and (h)(3) securing the first surface of the fourth liner to a second set of ridges on the third corrugated paper medium thereby creating a triple wall corrugated board.

16. The method of making corrugated board as recited in claim 15, wherein in step (e) the selected portion of the second corrugated paper medium is compressed in a direction transverse to a direction in which the first set of ridges of the second corrugated paper medium extend.

17. The method of making corrugated board as recited in claim 15 wherein step (d) further comprises aligning the second corrugated paper medium such that the first set of ridges of the second corrugated paper medium extend generally parallel with respect to the first set of ridges of the first corrugated paper medium.

18. The method of making corrugated board as recited in claim 15, further comprising scoring the cutout area after step (i).

19. The method of making corrugated board as recited in claim 15, wherein in steps (a), (c), (f) and (h)(2) each liner has a weight in the range of about 42 to 144 pounds per msf.

20. The method of making corrugated board as recited in claim 15, wherein in steps (a), (c) (f) and (h)(2) the liners are secured together using an adhesive.

21. A corrugated board, comprising:

(a) at least two paper liners secured in complementary facing engagement, forming a first multi-layer composite liner;

(b) at least two paper liners, secured in complementary facing engagement, forming a second multi-layer composite liner;

(c) a corrugated paper medium having corrugations defining a first set of ridges and a second set of ridges, the first set of ridges being secured to the first multi-layer composite liner and the second set of ridges being secured to the second multi-layer composite liner;

(d) a third liner; and (e) a second corrugated paper medium having corrugations defining a first set of ridges and a second set of ridges, the first set of ridges of the second corrugated paper medium being secured to the second multi-layer composite liner and the second set of ridges of the second corrugated paper medium being secured to the third liner.

22. The corrugated board as recited in claim 21 wherein each liner has a weight in the range of about 42 to 144 pounds per msf.

23. The corrugated board as recited in claim 21 wherein the liners are secured together using an adhesive.

24. The corrugated board of claim 21, further comprising:

(f) a fourth liner; and (g) a third corrugated paper medium having corrugations defining a first set of ridges and a second set of ridges, the first set of ridges of the first corrugated paper medium being secured to the third liner and the second set of ridges of the third corrugated paper medium being secured to the fourth liner.

25. The corrugated board as recited in claim 24 wherein each liner has a weight in the range of about 42 to 144 pounds per msf.

26. The corrugated board as recited in claim 24 wherein the liners are secured together using an adhesive.

27. A corrugated board container, comprising:

(a) a panel configured to define an interior enclosure and being comprised of:

(I) at least two paper liners, secured in complementary facing engagement, forming a first multi-layer composite liner;

(ii) at least two paper liners, secured in complementary facing engagement, forming a second multi-layer composite liner;

(iii) a corrugated paper medium having corrugations defining a first set of ridges and a second set of ridges, the first set of ridges secured to the first multi-layer composite liner and the second set of ridges secured to the second multi-layer composite liner;

(iv) a third liner; and (v) a second corrugated paper medium having corrugations defining a first set of ridges and a second set of ridges, the first set of ridges of the second corrugated paper medium being secured to the second multi-layer composite liner and the second set of ridges of the second corrugated paper medium being secured to the third liner.

28. The corrugated board container as recited in claim 27 wherein each liner has a weight in the range of about 42 to 144 pounds per msf.

29. The corrugated board container as recited in claim 27 wherein the liners are secured together using an adhesive.

30. The corrugated board container as recited in claim 27 wherein the panel further comprises:

(vi) a fourth liner; and (vii) a third corrugated paper medium having corrugations defining a first set of ridges and a second set of ridges, the first set of ridges of the first corrugated paper medium being secured to the third liner and the second set of ridges of the third corrugated paper medium being secured to the fourth liner.

31. The corrugated board container as recited in claim 30 wherein each liner has a weight in the range of about 42 to 144 pounds per msf.

32. The corrugated board container as recited in claim 30 wherein the liners are secured together using an adhesive.

33. The corrugated board container as recited in claim 30 wherein the panel includes a first subpanel, a second subpanel extending generally perpendicularly from the first subpanel, a third subpanel extending generally perpendicularly from the second subpanel, a fourth subpanel extending generally perpendicularly between the first and third subpanels such that the first, second, third and fourth subpanels are generally in the form of a parallelogram, each of the first, second, third and fourth subpanels having first and second edges.

34. The corrugated board container as recited in claim 31 further comprising a first top panel extending from the first edge of the first subpanel toward the third subpanel generally perpendicular with respect to the first subpanel, a second top panel extending from the first edge of the second subpanel toward the fourth subpanel generally perpendicular with respect to the second subpanel, a third top panel extending from the first edge of the third subpanel toward the first subpanel generally perpendicular with respect to the third subpanel, a fourth top panel extending from the first edge of the fourth subpanel toward the second subpanel generally perpendicular with respect to the fourth subpanel, the first top panel partially overlapping the second and fourth top panels, the third top panel partially overlapping the second and fourth top panels, at least two of the first, second, third and fourth top panels being secured to at least one of the first, second, third and fourth subpanels.

35. The corrugated board container as recited in claim 34 wherein the first, second, third and fourth top panels are constructed in the same manner as the first, second, third and fourth subpanels.

36. The corrugated board container as recited in claim 35 wherein a portion of the first and second multi-layer composite liners and the first and second corrugated paper mediums are removed from the first, second, third and fourth subpanels along the first edge to form a fold line between the first, second, third and fourth subpanels and the first, second, third and fourth top panels, respectively.

37. The corrugated board container as recited in claim 35, further comprising a first bottom panel extending from the second edge of the first subpanel toward the third subpanel generally perpendicular with respect to the first subpanel, a second bottom panel extending from the second edge of the second subpanel toward the fourth subpanel generally perpendicular with respect to the second subpanel, a third bottom panel extending from the second edge of the third subpanel toward the first subpanel generally perpendicular with respect to the third subpanel, a fourth bottom panel extending from the second edge of the fourth subpanel toward the second subpanel generally perpendicular with respect to the fourth subpanel.

38. The corrugated board container as recited in claim 37 wherein the first, second, third and fourth bottom panels are constructed in the same manner as the first, second, third and fourth subpanels.

39. The corrugated board container as recited in claim 38 wherein a portion of the first and second multi-layer composite liners and the first and second corrugated paper mediums are removed from the first, second, third and fourth subpanels along the second edge to form a fold line between the first, second, third and fourth subpanels and the first, second, third and fourth bottom panels, respectively.

40. The corrugated board container as recited in claim 39 wherein the fold line consists of a scored line.

41. A corrugated board, comprising:
- (a) a first paper liner;
- (b) a second paper liner;
- (c) a corrugated paper medium having corrugations defining a first set of ridges and a second set of ridges, the first set of ridges being secured to the first paper liner and the second set of ridges being secured to the second paper liner, at least one of the paper liners being a multi-layer composite liner comprising at least two paper liners secured in complementary facing engagement;
- (d) a third paper liner;
- (e) a second corrugated paper medium having corrugations defining a first set of ridges and a second set of ridges, the first set of ridges of the second corrugated paper medium being secured to the second paper liner and the second set of ridges of the second corrugated paper medium being secured to the third paper liner, at least one of the paper liners being a multi-layer composite liner comprising at least two paper liners secured in complementary facing engagement;
- (f) a fourth paper liner; and
- (g) a third corrugated paper medium having corrugations defining a first set of ridges and a second set of ridges, the first set of ridges of the first corrugated paper medium being secured to the third paper liner and the second set of ridges of the third corrugated paper medium being secured to the fourth paper liner, at least one of the paper liners being a multi-layer composite liner comprising at least two paper liners secured in complementary facing engagement.

* * * * *